United States Patent [19]
Ieki et al.

[11] Patent Number: 5,532,654
[45] Date of Patent: Jul. 2, 1996

[54] FSK MODULATOR USING SAW RESONATOR WITH SWITCHABLE CAPACITORS

[75] Inventors: Tsutomu Ieki; Yasuhiko Hirano, both of Nagaokakyo, Japan

[73] Assignee: Murata Manufacturing Co., Ltd., Japan

[21] Appl. No.: 457,284

[22] Filed: Jun. 1, 1995

[30] Foreign Application Priority Data

Jun. 28, 1994 [JP] Japan ................... 6-146670

[51] Int. Cl.⁶ .................................. H04L 27/12
[52] U.S. Cl. .............. 332/102; 331/107 A; 331/179; 375/272; 375/306
[58] Field of Search ................... 332/100, 102; 375/272, 306, 307; 331/107 A, 179

[56] References Cited

U.S. PATENT DOCUMENTS

| | | | |
|---|---|---|---|
| 4,684,853 | 8/1987 | Coash | 318/16 |
| 5,016,260 | 5/1991 | Masuda | 332/102 |
| 5,367,537 | 11/1994 | Anderson | 332/102 |

*Primary Examiner*—Siegfried H. Grimm
*Attorney, Agent, or Firm*—Majestic, Parsons, Siebert & Hsue

[57] ABSTRACT

An FSK modulator including an amplifier for oscillation has a surface acoustic wave resonator connected in series with a switching circuit formed without a variable-capacity diode but including a semiconductor switch and one or more fixed-capacity capacitors. When an input signal is received, the switch causes a capacitor or combination of capacitors to become connected in series with the surface acoustic wave resonator, providing oscillations with two frequencies to effect FSK modulation.

19 Claims, 3 Drawing Sheets

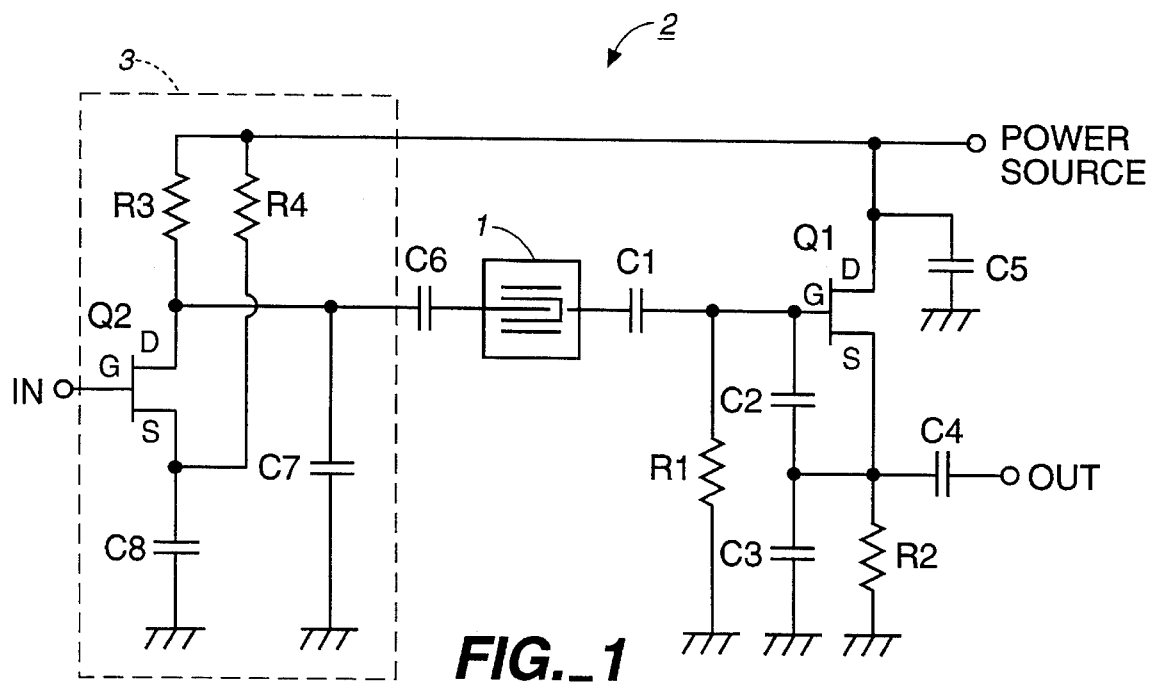
FIG._1
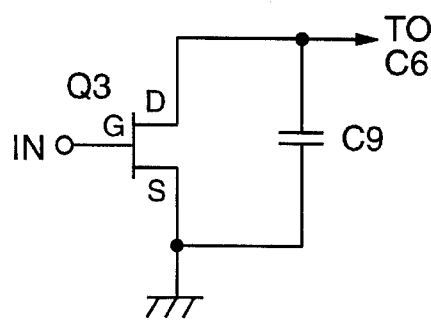
FIG._2
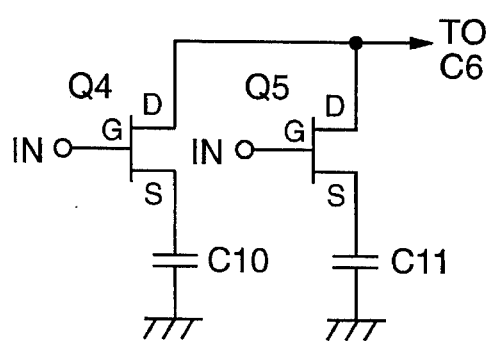
FIG._3

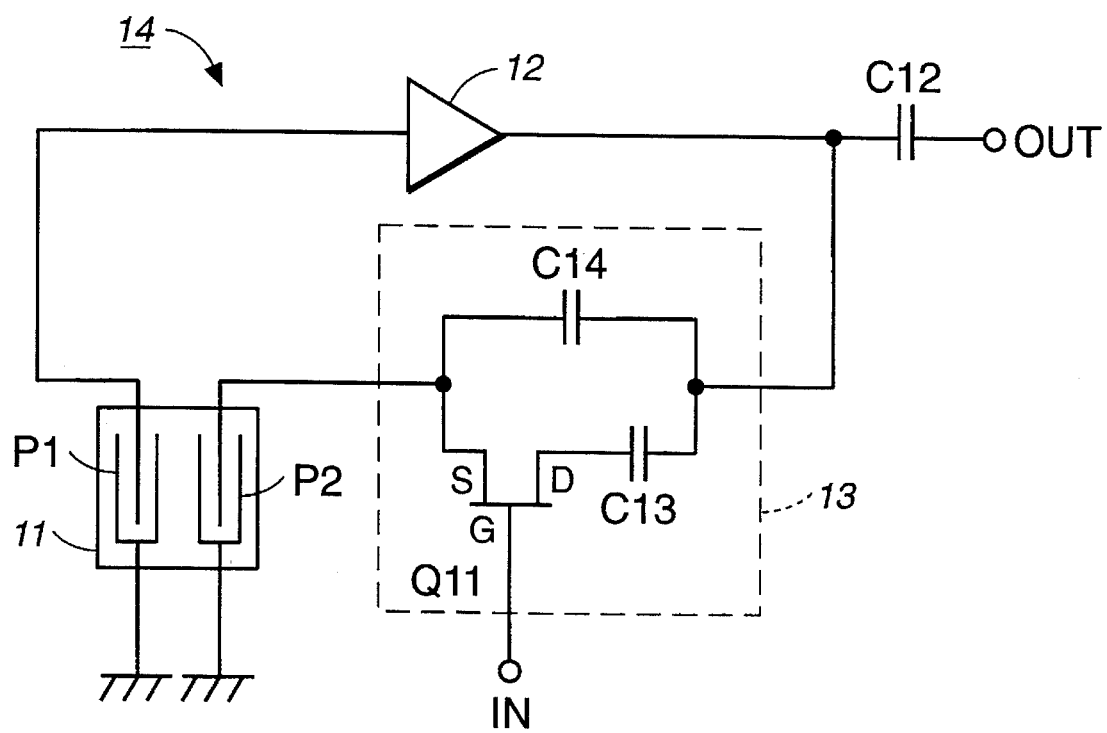
FIG._4
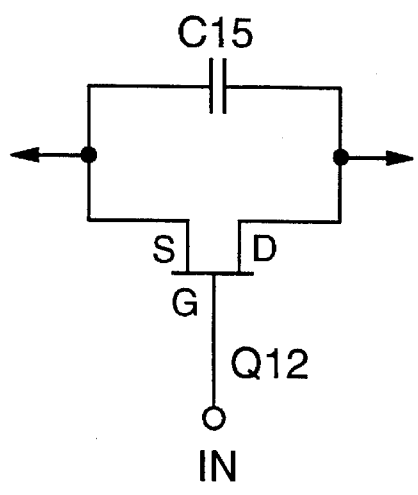
FIG._5
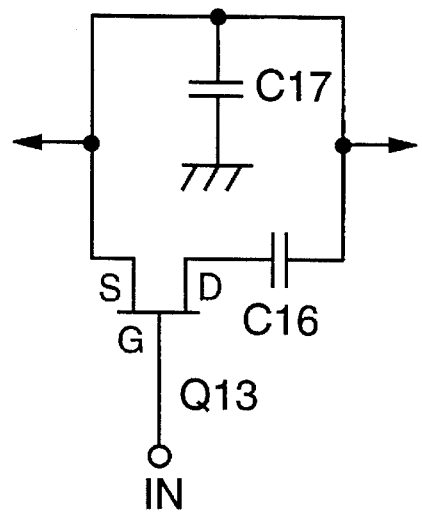
FIG._6

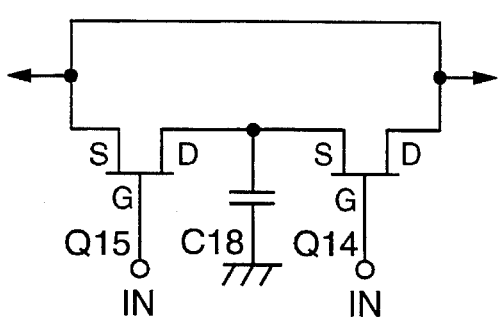
FIG._7
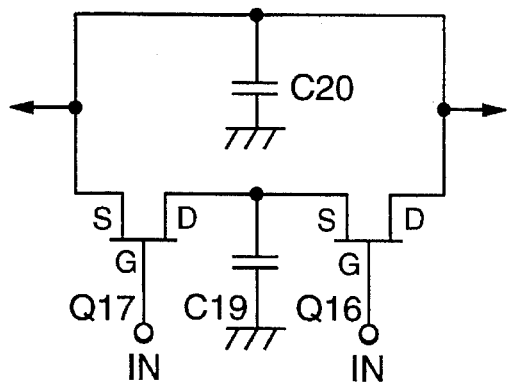
FIG._8
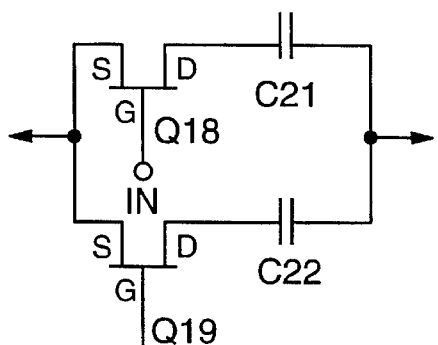
FIG._9
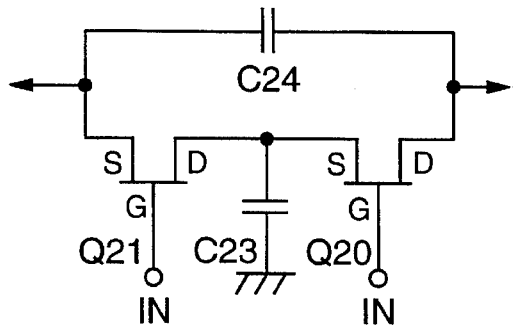
FIG._10
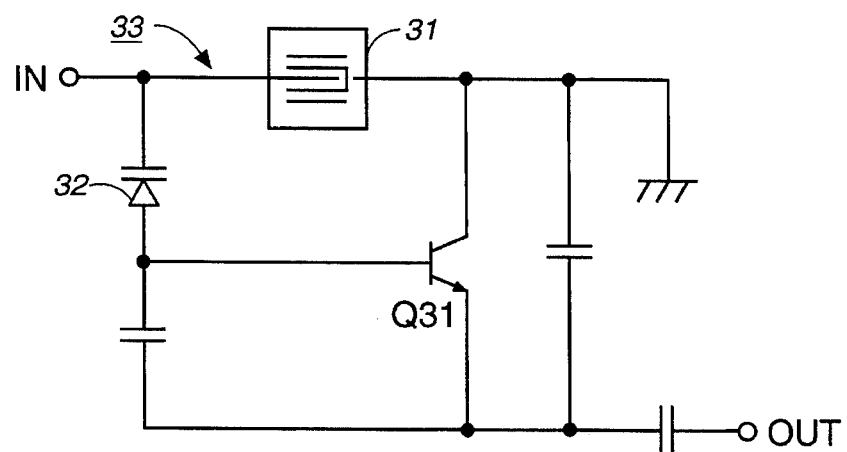
FIG._11
(PRIOR ART)

FSK MODULATOR USING SAW RESONATOR WITH SWITCHABLE CAPACITORS

BACKGROUND OF THE INVENTION

This invention relates to an FSK (Frequency Shift Keying) modulator using a surface acoustic wave resonator.

FIG. 11 is a circuit diagram for showing the principles of operation of a prior art FSK modulator using a surface acoustic wave resonator, comprising a transistor $Q_{31}$ having a surface acoustic wave resonator of a single port type 31 and a variable-capacity diode 32 connected in series between its collector and base and an input terminal for modulation connected to a junction between the surface acoustic wave resonator 31 and the variable-capacity diode 32. Inductive reactance is provided by the surface acoustic wave resonator 31 and the variable-capacity diode 32. Thus, the circuit shown in FIG. 10 may be said to be of a Colpitts type. When a digital input signal is applied to the variable-capacity diode 32, frequency of oscillation is changed accordingly, and a FSK-modulated signal is outputted.

It may be attempted to produce such a prior art FSK modulator in the form of a single-chip monolithic integrated circuit in order to make it compact, but the transistor $Q_{31}$ and the variable-capacity diode 32 cannot be formed on the same chip because they require different semiconductor production processes. In other words, prior art modulators of this type could not be made very compact.

SUMMARY OF THE INVENTION

It is therefore an object of this invention, in view of the problems as described above, to provide an FSK modulator which can be made compact in the form of a single-chip monolithic integrated circuit.

An FSK modulator including an amplifier for oscillation embodying the present invention, with which the above and other objects can be accomplished, may be characterized as comprising a surface acoustic wave resonator connected in series with a switching circuit which does not include a variable-capacity diode but is formed with a semiconductor switch and one or more fixed-capacity elements (hereinafter referred to simply as "capacitors") . When a modulation signal is received through the switch, a capacitor or combination of capacitors is connected in series with the resonator.

The surface acoustic wave resonator may be of a single-port type or of a two-port type. With the resonator and the semiconductor switch providing inductive reactance, the modulator may be considered to be in the form of a Colpitts oscillator. The surface acoustic wave resonator and the switching circuit may be connected so as to form a positive feedback amplifier.

With an FSK modulator thus formed, a semiconductor switch responds to an inputted modulation signal such that a different capacitor or combination of capacitors is connected in series with the surface acoustic wave resonator, thereby shifting phase of oscillation and causing oscillations with two different frequencies. Since no variable-capacity diodes are needed and all component parts except the surface acoustic wave resonator can be produced in the same production process, they can be placed on the same chip, and hence the modulator can be made compact in a single-chip monolithic form.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a circuit diagram of an FSK modulator according to a first embodiment of this invention;

FIG. 2 is a circuit diagram of another switching circuit which may replace the switching circuit shown in FIG. 1;

FIG. 3 is a circuit diagram of still another switching circuit which may replace the switching circuit shown in FIG. 1;

FIG. 4 is a circuit diagram of another FSK modulator according to a second embodiment of this invention;

FIGS. 5–10 are circuit diagrams of different switching circuits which may replace the switching circuit shown in FIG. 4; and FIG. 11 is a circuit diagram of a prior art FSK modulator.

DETAILED DESCRIPTION OF THE INVENTION

FIG. 1 shows an FSK modulator 2 in combination with an amplifier for oscillation according to a first embodiment of this invention, comprising a surface acoustic wave resonator 1 of a single-port type with one end connected through a capacitor $C_1$ to the gate of a field-effect transistor (FET) $Q_1$ for oscillation. A parallel connection of resistor $R_1$ and capacitors $C_2$ and $C_3$ is connected between the gate of FET $Q_1$ and the ground, and a junction between the capacitors $C_2$ and $C_3$ is connected to the source of FET $Q_1$. The source of FET $Q_1$ is also connected to the ground through resistor $R_2$ and to an output terminal OUT through capacitor $C_4$. The drain of FET $Q_1$ is connected not only to a power source but also to the ground through capacitor $C_5$.

The other end of the single-port surface wave resonator 1 is connected to the drain of FET $Q_2$ through capacitor $C_6$. The drain of FET $Q_2$ is connected to the ground through capacitor $C_7$ and to the power source through resistor $R_3$. The source of FET $Q_2$ is connect to the ground through capacitor $C_8$ and to the power source through resistor $R_4$. The gate of FET $Q_2$ serves as an input terminal for the modulator.

Of the component parts described above, FET $Q_2$, capacitors $C_7$, $C_8$ and resistors $R_3$, $R_4$ together form what is herein referred to as the switching circuit 3 wherein resistors $R_3$, $R_4$ serve to provide an appropriate bias to FET $Q_2$ and capacitors $C_1$, $C_6$ serve to prevent direct current from entering the surface acoustic wave resonator 1.

The FSK modulator 2 may be considered to be in the form of a Colpitts oscillator with the surface acoustic wave resonator 1 and the switching circuit 3 providing inductive reactance and the gate of FET $Q_2$ serving as its input terminal. When a digital signal is received through the gate of FET $Q_2$, FET $Q_2$ functions as a switch, the conduction between its drain and source being switched on and off accordingly. In the ON condition, the surface acoustic wave resonator 1 is connected in series with the parallel connection of the capacitors $C_7$ and $C_8$. In the OFF condition, only capacitor $C_7$ is connected in series with the surface acoustic wave resonator 1.

In other words, the phase of the oscillation is shifted, as the capacitors to be connected to the surface acoustic wave resonator 1 are switched in response to an input signal, and FSK modulation is effected through oscillations with two different frequencies. Since no variable-capacity diode is required, all components of this circuit except the surface wave resonator 1 can be formed as a monolithic integrated circuit on a single chip.

FIGS. 2 and 3 show variations on the switching circuit 3 shown in FIG. 1. The variation shown in FIG. 2 is characterized as having capacitor $C_9$ connected between the drain and the source of FET $Q_3$ and the drain of FET $Q_3$ connected to capacitor $C_6$. The variation shown in FIG. 3 is characterized as comprising two FETs $Q_4$ and $Q_5$ to provide two input terminals, having the drains of both FETs $Q_4$ and $Q_5$ connected to capacitor $C_6$. Capacitors $C_{10}$, $C_{11}$ are connected respectively between their sources and the ground.

If an input signal is received, FETs $Q_3$–$Q_5$ are switched on and off such that a different capacitor becomes connected to the surface acoustic wave resonator 1. The phase of the oscillation is thereby shifted, as explained above, and oscillations with two different frequencies are obtained. Although not specifically shown in FIGS. 2 and 3, it is to be understood that suitable biasing circuits are provided to FETs $Q_3$–$Q_5$ such that they can be switched on and off properly in response to an input signal.

FIG. 4 shows another FSK modulator 14 of a positive feedback amplifier according to a second embodiment of this invention, comprising a surface wave resonator 11 of two-port type. One end of one of the ports ($P_1$) is connected to the control (or input) port of an oscillation amplifier 12 which may be formed with a transistor or a FET, the other end being grounded. The output port of the amplifier 12 is connected not only to an output terminal OUT of the modulator through a capacitor $C_{12}$ but also to one end of the other port $P_2$ of the surface wave resonator 11 through a switching circuit 13. The other end of the port $P_2$ of the surface wave resonator 11 is grounded. The switching circuit 13 is formed with a FET $Q_{11}$ having its drain connected to one end of capacitor $C_{13}$, the other end of which is connected to the output port of the amplifier 12 and the output terminal OUT. The source of the FET $Q_{11}$ is connected to the second port $P_2$, and another capacitor $C_{14}$ is connected between a point between the output port of the amplifier 12 and capacitor $C_{13}$ and another point between the FET $Q_{11}$ and the surface acoustic wave resonator 11. The gate of FET $Q_{11}$ is connected to an input terminal IN.

If a digital signal is inputted through the input terminal IN, FET $Q_{11}$ is switched on and off between its drain and source. When it is conductive between the drain and the source, it is the parallel connection of capacitors $C_{13}$ and $C_{14}$ that is connected in series with the surface acoustic resonator 11. When it is in the OFF condition, only the capacitor $C_{14}$ is effectively connected in series with the surface acoustic wave resonator 11.

In other words, the phase of oscillation is shifted, as different capacitors come to be connected to the surface acoustic wave resonator 11 in response to an input signal, and FSK modulation is effected through oscillations with two different frequencies. Since no variable-capacity diode is required, all components of this circuit except the surface wave resonator 11 can be formed as a monolithic integrated circuit on a single chip.

FIGS. 5–9 show several different circuits which may be substituted for the switching circuit 13 shown in FIG. 4. FIG. 5 shows a variation characterized as having a FET $Q_{12}$, of which the drain and the source are connected by a capacitor $C_{15}$, the output port of the amplifier 12 being connected to either the drain or the source of the FET $Q_{12}$, and the surface acoustic wave resonator 11 being connected to the other (that is, either to the source or to the drain). FIG. 6 shows a second variation characterized as having a FET $Q_{13}$, the drain and the source of which are connected by a capacitor $C_{16}$, another capacitor $C_{17}$ being connected between the ground and a junction between the source of the FET $Q_{13}$ and the capacitor $C_{16}$, a point between the junction and capacitor $C_{16}$ being connected to either the output port of the amplifier 12 or the surface acoustic wave resonator 11, and another point between the junction and the source of the FET $Q_{13}$ connected to the other. FIG. 7 shows a third variation characterized as having two FETs $Q_{14}$, $Q_{15}$, the source of FET $Q_{14}$ and the drain of FET $Q_{15}$ being connected together and grounded together through a capacitor $C_{18}$, the drain of FET $Q_{14}$ being connected to the source of FET $Q_{15}$. The output port of the amplifier 12 is connected either to the drain of FET $Q_{14}$ or to the source of FET $Q_{15}$, and the surface acoustic wave resonator 11 is connected to the other. FIG. 8 shows a fourth variation characterized as having two FETs $Q_{16}$, $Q_{17}$, the source of FET $Q_{16}$ and the drain of FET $Q_{17}$ being connected together and grounded together through a grounding capacitor $C_{19}$, the drain of FET $Q_{16}$ being connected to the source of FET $Q_{17}$ and a junction therebetween being connected to the ground through another grounding capacitor $C_{20}$. The output port of the amplifier 12 is connected either to the drain of FET $Q_{16}$ or to the source of FET $Q_{17}$, and the surface acoustic wave resonator 11 is connected to the other. FIG. 9 shows a fifth variation characterized as having two FETs $Q_{18}$, $Q_{19}$, the drain of FET $Q_{18}$ being connected to one end of a capacitor $C_{21}$, the drain of FET $Q_{19}$ being connected to one end of another capacitor $C_{22}$, the sources of both FETs $Q_{18}$, $Q_{19}$ being connected to each other and either to the surface acoustic wave resonator 11 or to the output port of the amplifier 12, and the other ends of capacitors $C_{21}$, $C_{22}$ being connected with each other and also to the other (of the surface acoustic wave resonator 11 and the output port of the amplifier 12). FIG. 10 shows a sixth variation characterized as having two FETs $Q_{20}$, $Q_{21}$, the source of FET $Q_{20}$ and the drain of FET $Q_{21}$ being connected together and grounded together through a capacitor $C_{23}$, the drain of FET $Q_{20}$ and the source of FET $Q_{21}$ being connected through another capacitor $C_{24}$. The output port of the amplifier 12 is connected either to the drain of FET $Q_{20}$ or to the source of FET $Q_{21}$, and the surface acoustic wave resonator 11 is connected to the other.

If an input signal is received by any of the FETs $Q_{12}$–$Q_{21}$ in these variations, it is switched on or off and a different capacitor or combination of capacitors with different capacitive reactance comes to be connected to the surface acoustic wave resonator 11. As a result, the oscillation phase is shifted, and oscillations with two different frequencies are obtained. Although not shown in these figures, it is again to be understood that there are biasing circuits provided such that the FETs $Q_{12}$–$Q_{21}$ can switch between ON and OFF conditions properly in response to an input signal.

The sixth variation shown in FIG. 10 may be considered a preferred embodiment of the invention because the phase shift is in the forward direction as the signal passes through the capacitor $C_{24}$ if the FET $Q_{20}$ or $Q_{21}$ is in the OFF condition while the phase shift will be in the backward direction as the signal passes between the source of FET $Q_{20}$ and the drain of FET $Q_{21}$ when the FETs $Q_{20}$ and $Q_{21}$ are both in the ON condition. In other words, a greater phase difference can be obtained between the ON and OFF conditions.

Although the present invention has been described above with reference to only a limited number of examples, they are intended to be merely illustrative, not as limiting. Many modifications and variations are possible within the scope of this invention. For example, the relative positions between the surface acoustic wave resonator 11 and any of the switching circuits in FIGS. 4–10 may be reversed, although different positional configurations are not separately illustrated in figures. In other words, the series connection of a surface acoustic wave resonator and a switching circuit in all these examples may be connected to the amplifier 12 such that the surface acoustic wave resonator is connected to the control port of the amplifier 12 (as shown in FIG. 4) or to the output port (although not separately illustrated).

Although the present invention has been described above as using FETs for semiconductor switches for the switching circuits 3, 13, it is not intended to limit the scope of this invention. Use may be made of bipolar transistors or diodes. It must be remembered, however, that semiconductor switches, for use in this application, should have a sufficiently fast response time against modulation signals.

In summary, an FSK modulator according to this invention is characterized as using a semiconductor switch to switch fixed-capacity capacitors provided in a switching circuit in response to an input signal such that the phase of oscillation is varied. Thus, the semiconductor components for oscillation and the semiconductor components for the switching circuit can be manufactured in the same production process, and an FSK modulator can be formed as a monolithic integrated circuit on a single chip carrying all its components except the surface acoustic wave resonator. In other words, the present invention makes it possible to produce compact FSK modulators.

What is claimed is:

1. In combination with an amplifier for oscillation, an FSK modulator comprising:

a surface acoustic wave resonator connected to said amplifier;

a switching circuit connected in series with said surface acoustic wave resonator, said switching circuit including one or more fixed-capacity capacitors and a semiconductor switch having first and second terminals and being capable of being set in an ON condition or an OFF condition wherein said semiconductor switch is respectively conductive or non-conductive between said first and second terminals and thereby causing one or a combination of said fixed-capacity capacitors to be connected in series with said surface acoustic wave resonator; and an input terminal connected to said semiconductor switch for receiving input signals for setting said semiconductor switch selectably in said ON or OFF condition.

2. The FSK modulator of claim 1 wherein said switching circuit further includes a first grounding capacitor and a second grounding capacitor connecting respectively said first and second terminal to the ground, said first terminal being connected to said surface acoustic wave resonator.

3. The FSK modulator of claim 1 wherein said switching circuit further includes a fixed-capacity capacitor connected between said first and second terminals of said semiconductor switch, said first terminal of said semiconductor switch being connected to said surface acoustic wave resonator.

4. The FSK modulator of claim 1 wherein said semiconductor switch is one of two similarly structured switches, the first terminal of each of said two semiconductor switches being connected to said surface acoustic wave resonator, the second terminal of each of said two semiconductor switches being connected to the ground through a fixed-capacity capacitor.

5. A FSK modulator comprising:

an amplifier including:
    a field-effect transistor (FET) for oscillation having a gate, a source and a drain;
    a first capacitor connected to the gate of said FET; and
    a second capacitor connected in series with said first capacitor between said first capacitor and the ground, a junction point between said first and second capacitors being connected to the source of said FET, through a resistor to the ground and to an output terminal, the drain of said FET being connected through a third capacitor to the ground;

a surface acoustic wave resonator connected to the gate of said FET;

a switching circuit connected in series with said surface acoustic wave resonator, said switching circuit including one or more fixed-capacity capacitors and a semiconductor switch having first and second terminals and being capable of being set in an ON condition or an OFF condition wherein said semiconductor switch is respectively conductive or non-conductive between said first and second terminals and thereby causing one or a combination of said fixed-capacity capacitors to be connected in series with said surface acoustic wave resonator; and an input terminal connected to said semiconductor switch for receiving input signals for setting said semiconductor switch selectably in said ON or OFF condition.

6. The FSK modulator of claim 5 wherein said switching circuit further includes a first grounding capacitor and a second grounding capacitor connecting respectively said first and second terminal to the ground, said first terminal being connected to said surface acoustic wave resonator.

7. The FSK modulator of claim 5 wherein said switching circuit further includes a fixed-capacity capacitor connected between said first and second terminals of said semiconductor switch, said first terminal of said semiconductor switch being connected to said surface acoustic wave resonator.

8. The FSK modulator of claim 5 wherein said semiconductor switch is one of two similarly structured switches, the first terminal of each of said two semiconductor switches being connected to said surface acoustic wave resonator, the second terminal of each of said two semiconductor switches being connected to the ground through a capacitor.

9. In combination with an amplifier for oscillation having a control port and an output port, an FSK modulator comprising:

a surface acoustic wave resonator of a two-port type having a first port and a second port, one end of said first port being connected to either one of said control and output ports of said amplifier, the other end of said first port being grounded;

a switching circuit connected between one end of said second port of said surface acoustic wave resonator and the other of said control and output ports of said amplifier, the other end of said second port of said surface acoustic wave resonator being grounded, said switching circuit including one or more fixed-capacity capacitors and a semiconductor switch, said semiconductor switch having first and second terminals and being capable of being set in an ON condition or an OFF condition wherein said semiconductor switch is respectively conductive or non-conductive between said first and second terminals and thereby causing one or a combination of said fixed-capacity capacitors to be connected in series with said surface acoustic wave resonator; and an input terminal connected to said semiconductor switch for receiving input signals for setting said semiconductor switch selectably in said ON or OFF condition.

10. The FSK modulator of claim 9 wherein said switching circuit includes two series-connected fixed-capacity capacitors connected between said first and second terminals of said semiconductor switch, a junction point between said two series-connected capacitors being connected to either one of said control and output ports of said amplifier, said second port of said surface acoustic wave resonator being connected to another junction point between said first terminal of said semiconductor switch and said two series-connected capacitors.

11. The FSK modulator of claim 9 wherein said switching circuit includes two series-connected fixed-capacity capacitors connected between said first and second terminals of said semiconductor switch, a junction point between said two series-connected capacitors being connected to said second port of said surface acoustic wave resonator, either one of said control and output ports of said amplifier being connected to another junction point between said first terminal of said semiconductor switch and said two series-connected capacitors.

12. The FSK modulator of claim 9 wherein said switching circuit includes a terminal-connecting fixed-capacity capacitor between said first and second terminals of said semiconductor switch, a junction point between said first terminal and said terminal-connecting capacitor being connected to either one of said control and output ports of said amplifier, another junction point between said second terminal and said terminal-connecting capacitor being connected to said second port of said surface acoustic wave resonator.

13. The FSK modulator of claim 9 wherein said switching circuit includes a terminal-connecting fixed-capacity capacitor connected between said first and second terminals of said semiconductor switch and a grounding capacitor connecting a grounding point between said first terminal and said terminal-connecting capacitor to the ground, a junction point between said terminal-connecting capacitor and said grounding point being connected to said second port of said surface acoustic wave resonator, another junction point between said first terminal and said grounding point being connected to either one of said control and output ports of said amplifier.

14. The FSK modulator of claim 9 wherein said switching circuit includes a terminal-connecting fixed-capacity capacitor connected between said first and second terminals of said semiconductor switch and a grounding capacitor connecting a grounding point between said first terminal and said terminal-connecting capacitor to the ground, a junction point between said terminal-connecting capacitor and said grounding point being connected to either one of said control and output ports of said amplifier, another junction point between said first terminal and said grounding point being connected to said second port of said surface acoustic wave resonator.

15. The FSK modulator of claim 9 wherein said semiconductor switch is one of two similarly structured switches consisting of a first switch and a second switch, the first terminal of said first switch being connected to said second port of said surface acoustic wave resonator, the second terminal of said second switch being connected to either one of said control and output terminals of said amplifier, said second terminal of said first switch and said first terminal of said second switch being both grounded through a common grounding capacitor, said first terminal of said first switch being connected to said second terminal of said second switch.

16. The FSK modulator of claim 15 wherein said first terminal of said first switch and said second terminal of said second switch being both grounded together through another common grounding capacitor.

17. The FSK modulator of claim 9 wherein said semiconductor switch is one of two similarly structured switches consisting of a first switch and a second switch, said first terminals of both said first and second switches being connected to said second port of said surface acoustic wave resonator, said second terminals of both said first and second switches being connected to either one of said control and output terminals of said amplifier individually through a fixed-capacity capacitor.

18. The FSK modulator of claim 9 wherein said semiconductor switch is one of two similarly structured switches consisting of a first switch and a second switch, said first terminals of both said first and second switches being connected to either one of said control and output terminals of said amplifier individually through a fixed-capacity capacitor, said second terminals of both said first and second switches being connected to said second port of said surface acoustic wave resonator.

19. The FSK modulator of claim 15 wherein said first terminal of said first switch is connected to said second terminal of said second switch through another fixed-capacity capacitor.

* * * * *